United States Patent Office 3,345,198
Patented Oct. 3, 1967

3,345,198
PROCESS FOR COLORING TEXTILE
MATERIALS AND FOILS
Gerhard Pfeiffer, Kelkheim, Taunus, Kurt Stetzelberg, Frankfurt am Main, and Fritz Winkler, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 7, 1964, Ser. No. 358,054
Claims priority, application Germany, Apr. 9, 1963, F 39,438
19 Claims. (Cl. 117—38)

ABSTRACT OF THE DISCLOSURE

Process and composition for producing a colored film on textiles by coating the textile with a stabilized diazonium compound and a polyvinyl acetoacetic acid ester prepared by reacting diketene with an at least partially hydrolyzed graft copolymer of a vinyl ester on polyvinyl pyrrolidone, and then heating to cause reaction and color formation.

---

The present invention provides a process for preparing fast colorations and prints on fibrous materials and foils, wherein a synthetic resin film, colored by a chemical reaction occurring therein, is fixed onto a substrate.

We have found that fast colorations and prints can be prepared on fibrous materials and foils by applying to these materials, in one or several steps, aqueous preparations containing (a) a polyvinyl-acetoacetic acid ester modified by polyvinyl-pyrrolidone,
(b) a stabilized diazonium compound, and, if desired,
(c) an aminoplast condensation product which may be partially or completely etherified, and, if desired,
(d) a thickening agent, fixing the colorations and prints by subjecting the materials treated to an acid or neutral steaming process at temperatures of about 90 to about 120° C. for about 5–10 minutes, or by dry heating them to an elevated temperature, preferably during 30 seconds up to 10 minutes to a temperature above 100° C. and, depending on the materials to be colored, up to about 200° C.

Both methods of fixation may be followed by an aftertreatment with an aqueous formaldehyde solution. This aftertreatment is preferably carried out with heating, for example during about ½ to 2 minutes at 90–100° C. The concentration of the formaldehyde is generally kept at about 1–10 g./l., preferably 2–5 g./l. The aftertreatment with formaldehyde may also be connected with the fixation by steaming, by carrying out the steaming process in the presence of formaldehyde. The materials are then soaped and rinsed in the usual manner.

The polyvinyl-acetoacetic esters modified by polyvinylpyrrolidone used according to the invention as film formers may be prepared by reacting polyvinyl alcohol modified by polyvinyl-pyrrolidone in known manner with diketene. For this purpose, there may be used polyvinyl alcohols which contain in addition to vinyl-pyrrolidone units also vinyl ester units, preferably vinyl acetate units, in the molecule. For the reaction with diketene, there may be used polyvinyl alcohols which are obtained by saponification or ester radical interchange of graft polymers of vinyl esters, preferably vinyl acetate, with polyvinyl-pyrolidone. The K-value of the graft polymers is not of decisive importance; preferably, polymers having K-values in the range of 15 and 95 may be used. The said graft polymers can be prepared, for example, according to the process described in German patent application No. 1,149,904, laid open to public inspection on June 6, 1963, wherein the graft polymerization is carried out in a solvent suitable for the polyvinyl-pyrrolidone in the presence of free radical catalysts such, for example, as organic peroxides, per-salts, hydroperoxides, redox catalysts, preferably azo compounds, and/or under exposure to ultraviolet light under conditions as such known. As solvents, there are suitable, for example, ketones, water or also vinyl esters themselves, or preferably alcohols, either alone or in admixture with other solvents. The polymerization temperatures to be used depends on the respective vinyl ester and above all on the type of catalyst. When using peroxide catalysts, one operates in general at temperatures from about 40 to 100° C., with redox systems at temperatures from 0 to 40° C.

As vinyl esters, there may be used, for example, vinyl propionate, vinyl butyrate, vinyl stearate, vinyl benzoate, and especially vinyl acetate. These vinyl esters can be polymerized either alone or in admixture with one another or in admixture with other copolymerizable compounds such as maleic acid esters of fumaric acid esters.

The molecular weight of the polyvinyl-pyrrolidone can vary within wide limits; preferably a polyvinyl-pyrrolidone is used having a K-value in the range from about 10 to 100 (determined in 1% methanolic solution); however, there may also be used higher or lower molecular products, provided they are at least somewhat soluble in the reaction mixture.

With a view to obtaining stable dispersions, it is of advantage to use for the reaction with diketene such saponification or ester radical interchange products of the mentioned graft polymers as contain in addition to vinyl alcohol units and vinyl-pyrrolidone units also vinyl ester units, preferably vinyl acetate units, in the molecule. The modified polyvinyl alcohols may contain about 6–30 percent by weight of these vinyl acetate units, preferably 15–25 percent by weight. As the other components, the modified polyvinyl alcohols contain generally 42–86 percent by weight, preferably 45–70 percent by weight, of polyvinyl alcohol units and about 8–28 percent by weight, preferably 15–30 percent by weight, of vinyl pyrrolidone units.

Such modified polyvinyl alcohols can be prepared by the partial hydrolysis of graft copolymers of a vinyl ester, preferably vinyl acetate, on polyvinyl pyrrolidone. These copolymers contain 80 to 95, preferably 80 to 90, parts by weight of vinyl ester units and 5 to 20, preferably 10 to 20, parts by weight of polyvinyl pyrrolidone. The complete or partial hydrolysis of the vinyl ester groups of the graft copolymers is generally carried out in the presence of a lower alcohol, preferably in a mixture of methanol and methyl acetate. It may also be carried out to the desired extent, preferably until 20 to 100 percent by weight of the ester units in the graft copolymer have been hydrolyzed, in an alkaline or acid medium at room temperature or at an elevated temperature, for example at the boiling point of the solvent employed.

The reaction of the modified polyvinyl alcohols with the diketene can be carried out by several known methods, for example, by heating the components in dimethylformamide, and ketones such as methyl-ethyl ketone or cyclohexanone. However, it is preferable to use the process proposed by Staudinger and Häberle (cf., "Die Makromolekulare Chemie," volume IX, 1953, pages 52, et seq., and German Patent 940,680) in which the reaction is carried out in organic acids, especially glacial acetic acid, with catalytic amounts of weakly basic or acidic catalysts, for example, sodium acetate, at temperature in the range from about 40–90° C. In contradistinction to other processes, one can operate according to this process with nearly stoichiometrical amounts of diketene and colorless reaction products are obtained, while with other solvents an excess of diketene must be used and dark colored products are obtained.

In order to prevent autoxidation which might cause a premature cross-linking of the final product, it is expedient to operate in the absence of the atmospheric air oxygen.

For carrying out the reaction, the anhydrous modified polyvinyl alcohol in the form of a fine powder is suspended in about 8–10 times the amount of an organic acid, for example, glacial acetic acid. After the addition of 2 percent by weight (calculated on the modified polyvinyl alcohol) of anhydrous sodium acetate as the catalyst, the reaction is carried out, while stirring with 75–85% of the stoichiometrical amount of diketene. Since when modified polyvinyl alcohols are used, the free hydroxyl groups are not completely reacted as is the case with pure polyvinyl alcohols, not even when using an excess of diketene, it is not at all necessary to use the diketene in stoichiometrical quantity or in excess. The reaction sets in at about 45° C. and the temperature may rise in the further course of the reaction to about 60° C. To complete the reaction, it is advantageous to keep the temperature at about 60–80° C., for some time. As esterification proceeds, a swelling occurs and the mixture passes through a viscous phase. Finally, complete solution takes place. From this solution, the major part of the organic acid (acetic acid) can be recovered by distillation under reduced pressure and can be used for further reactions.

The polyvinyl-acetoacetic acid esters modified by polyvinyl-pyrrolidone, used according to the present invention, are surprisingly more stable than the acetoacetic acid esters modified by polyalkylene glycol or polyalkylene oxide. The aqueous preparations of the polyvinyl-acetoacetic acid esters modified by polyvinyl pyrrolidone according to the present invention are distinguished by a prolonged stability, even at elevated temperatures. This increased stability is of great importance in practice, especially for rendering the methods of operation more economical and easier, because repeated preparation of the compositions is no longer required. The preparations of the present invention show marked advantages even with regard to the safety of performance of the printing and coloring operations, because the often observed clogging of the film screens in screen printing as well as the sticking of roller printing engravings no longer occurs, which saves time-consuming and costly purification operations.

Over the hitherto used polyvinyl alcohols, the polyvinyl alcohols modified by polyvinyl-pyrrolidone offer the advantage that a preliminary grinding of these substances is not necessary, since glacial acetic acid is for them an excellent dividing or swelling agent, so that even very coarse parts decompose rapidly into fine flocks.

As stabilized diazonium compounds, there may be used in the process of the present invention especially compounds in the form of fast dyeing salts (cf., for example, Ullmann, "Encyclpädie der Technischen Chemie," 3rd edition, München 1954, volume 5, pages 795–797 and volume 4, pages 138–139).

As aminoplast precondensation products whose methylol groups may be partially or completely etherified by low molecular weight alcohols, there may be used especially N-methylol compounds obtained from 1 mol of urea and 1–4 mols of formaldehyde or of 1 mol of melamine and 1–6 mols of formaldehyde. For the etherification of the methylol radicals of the precondensation products, there may be used low molecular weight monofunctional or bifunctional aliphatic alcohols having 1–4 C-atoms, for example, methanol, butanol, ethylene glycol, and butanediol-1,4, or mixtures of these alcohols. The aminoplast precondensation products and the methyl ethers thereof are preferably used for the coloration of materials of regenerated cellulose.

In the preparations used according to the process of the present invention, the ratio of the individual components, i.e., the modified polyvinyl-acetoacetic ester, the stabilized diazonium compound and the aminoplast precondensation product which, if desired, may be used simultaneously, may vary within wide limits. The amount of diazonium compound depends in the first instance on the depth of the desired dyeing. In general, 0.05–0.5 part by weight of the stabilized diazonium compound and, if desired, 0.5–1.5 parts by weight of the aminoplast precondensation product are used per 1 part by weight of modified polyvinyl-acetoacetic acid ester.

For preparing printing pastes, the stabilized diazonium compound as the color-giving component is admixed with an aqueous preparation consisting of the modified polyvinyl-acetoacetic ester and a thickening agent, for example, tragacanth, alginate, starch, vegetable gum, a benzine emulsion, and the like and if desired an aminoplast precondensation product. In a modification of the usual printing methods it is possible to apply to the substratum first the printing paste consisting of the aforesaid two or three components, the modified polyvinyl-acetoacetic acid ester, the thickening agent, and, if desired, the aminoplast precondensation product, to dry at temperatures of up to about 80° C. and then to apply to the printed material in any desired manner, for example, by immersion, a solution of the stabilized diazonium salt. Thereupon, coupling with the diazonium compound takes place on the printed places.

For coloring, the material to be colored is impregnated in analogous manner with an aqueous solution containing the polyvinyl-acetoacetic ester modified by polyvinylpyrrolidone, and, if desired, an aminoplast precondensation product, and, if desired, a thickening agent and after drying at temperatures of up to 80° C., the material is treated, for example by padding, with a diazonium salt solution. There may also be used a padding solution which already contains the stabilized diazonium compound.

After printing or padding, the further treatment is carried out as described before either by steaming or dry heating and, if desired, further treating with formaldehyde or steaming in the presence of formaldehyde. As materials which can be printed or colored, there are mentioned by way of example, fabrics, knitted fabrics, fiber fleeces and similar fabrics made from natural or regenerated cellulose, acetylated collulose, wool, silk or synthetic fibers for example, those made from polyamides, polyesters, polyacrylonitriles, dinitrile, and polyvinyl, glass fibers or asbestos. The process may also be used for coloring or printing foils of any kind for example, those based on cellulose or synthetic materials as well as paper, cardboard, and the like.

The present invention provides colorations and prints that have a good fastness and an agreeable handle.

The following examples illustrate the invention, but they are not intended to limit it thereto:

EXAMPLE 1

A cotton fabric was printed with a printing paste having the following composition:

| | Parts by weight |
|---|---|
| Parts by weight of an aqueous solution of 35% of a polyvinylacetic acid ester modified by polyvinyl pyrrolidone, prepared according to the process hereinafter described | 200 |
| Parts by weight of an aqueous solution of 80% strength of dimethylol urea, which is etherified by 1 mol of methanol and 1 mol of butanediol-1,4 per 1 mol percondensation product | 30 |
| Parts by weight of the diazonium chloride of 5-amino-2-benzoylamino - 1,4 - diethoxy-benzene-hydrochloride, stabilized with zinc chloride | 10 |
| Parts by weight of the oil-in-water emulsion hereinafter described | 760 |
| Parts by weight | 1000 |

After printing and drying, the goods were heated for 5 minutes to 150° C., aftertreated for 1 minute at 95° C. with a solution containing per litre 2 g. of formaldehyde (40% strength) and then rinsed and dried. The vivid reddish yellow print exhibited a soft handle and good fastness.

PREPARATION OF THE POLYVINYL ACETOACETIC ACID ESTER MODIFIED WITH POLYVINYL PYRROLIDONE (a) *Preparation of the starting graft polymer of polyvinylpyrrolidone on vinyl acetate*

900 parts by weight of vinyl acetate, 100 parts by weight of polyvinyl pyrrolidone having a K-value of 31.2, 2 parts by weight of $\alpha,\alpha'$-azo-diisobutyronitrile and 500 parts by weight of methanol were stirred for 10 hours at 90° C. water bath temperature under reflux in a vessel provided with stirrer and reflux cooler. After 3, 5, and 7 hours respectively, each time 1 part by weight of $\alpha,\alpha'$-azo-diisobutyronitrile, each time dissolved in 50 parts by weight of methanol, was added. For removing small quantities of unreacted vinyl acetate, 150 parts by weight of solvent were distilled off at atmospheric pressure and replaced by fresh methanol. A viscous, somewhat turbid solution of graft polymer was obtained. The K-value was 38, measured in 1% methanol.

(b) *Partial ester radical interchange of the graft polymer to yield the modified polyvinyl alcohol*

The above solution of polymer was diluted in the same apparatus with 1000 parts by weight of methyl acetate and 730 parts by weight of methanol and 49.5 parts by weigh of a methanolic sodium hydroxide solution having a strength of 10 percent by weight, were added at 20° C., while rapidly stirring. After 20–25 minutes the solution became highly viscous and after a further 20–30 minutes it turned relatively fluid. 2 hours after the addition of the sodium hydroxide solution, 8.2 parts by weight of glacial acetic acid, diluted with 11.8 parts by weight of methanol were added. During the ester radical interchange, the internal temperature was kept at 20–25° C. by means of a water bath. A creamy suspension of the modified polyvinyl alcohol was obtained, from which the methanol and the methylacetate formed by the interchange of ester radicals were removed by distillation under reduced pressure, with continuous stirring, at first at a temperature of the water bath of 60° C. A granular product was formed which was liberated from the last residues of solvent by increasing the bath temperature to 90° C.

The analysis showed:
59.6 percent by weight of vinyl alcohol units;
25.1 percent by weight of vinyl acetate units;
15.3 percent by weight of vinyl pyrrolidone units.
The K-value was 45, measured 1% in water.

(c) *Preparation of the modified polyvinylacetoacetic acid ester*

150 parts by weight of the modified polyvinyl alcohol obtained according to (b) were combined in the above-described apparatus with 1290 parts by weight of glacial acetic acid containing 3 parts by weight of anhydrous sodium acetate in dissolved state, and the whole was intensely stirred. The coarse granular product was thereby divided into fine flocks. 170 parts by weight (100% of the theory) of freshly distilled diketene were then added at 20° C. With a temperature of the water bath of 50° C., the internal temperature was raised, while stirring continuously, to 45° C. After having switched off the heating of the bath, the temperature further rose to 66° C. in the course of 35 minutes and then started falling. The bath temperature was then increased to 60° C. and the internal temperature rose in 10 minutes to 66° C. and fell then again.

The bath temperature was then raised to 80° C. The internal temperature rose in 20 minutes to 78.5° C. and was kept for 1 hour at this value. The total time of reaction was 4½ hours. A clear solution was obtained from which 1020 parts by weight of acetic acid were removed by distillation under reduced pressure, while stirring continuously. The viscous residue was precipitated with distilled water, while slowly stirring, decanted and freed from acetic acid and sodium acetate by repeated decanting with fresh water.

The water-containing residue was converted into a milky solution by intense stirring under reflux with 380 parts by weight of methanol. From this solution, the methanol was removed by distillation under reduced pressure on the water bath at 50° C. A stable, aqueous dispersion was obtained which even after months long storage did not show any signs of gelation. The content of solids was 35%.

*Preparation of the oil-in-water emulsion*

Into a solution of:

3.3 parts by weight of the reaction product of 1 mol of triisobutylphenol with 13 mols of ethylene oxide in 146.7 parts by weight of water, there were incorporated by emulsification 850 parts by weight of white spirit having a boiling range from 190–230° C. Total, 1000 parts by weight.

EXAMPLE 2

A staple fiber fabric was printed with a mixture consisting of 200 parts by weight of the ketenized polyvinyl alcohol derivative described in Example 1,
30 parts by weight of the etherification product of the urea-formaldehyde precondensation product likewise described in Example 1,
10 parts by weight of the diazonium chloride of 1-methyl-2 - benzoylamino - 4-methoxy-5-amino-benzene hydrochloride stabilized with $ZnCl_2$, and
760 parts by weight of an oil-in-water emulsion prepared according to Example 1.

After drying, the fabric was steamed for 10 minutes at 102° C. in the presence of a 40% formaldehyde solution. After rinsing and drying, a greenish yellow print was obtained that had very good fastness properties and a soft handle.

EXAMPLE 3

A cotton fabric was printed with a printing paste having the following composition:

200 parts by weight of the reaction product of diketene with partially saponified graft polymer, consisting of 70% vinyl alcohol units, 15% vinylpyrrolidone units and 15% vinylacetate units, described in Example 1,
30 parts by weight of an aqueous solution of about 80% strength of a dimethylol urea etherified with 1 mol of methanol and 1 mol of butanediol-1,4, and 770 parts by weight of the oil-in-water emulsion described in Example 1.

After drying, the fabric was padded with a solution of 10 parts by weight of the stabilized diazonium chloride of 2 - amino-4-methoxy-5-methyl-2'-chloro-4'-nitro-1,1'-azobenzene in 990 parts by weight of water at room temperature and then heated for 5 minutes to 150° C. The fabric was then aftertreated for 1 minute at 95° C. with a solution containing per litre 2 g. of formaldehyde, then well rinsed, soaped, rinsed again and dried. A red film of synthetic resin was obtained on the printed places, that had very good properties of fastness and a soft handle.

EXAMPLE 4

A cotton fabric was printed with a mixture of 200 parts by weight of the ketenized polyvinyl alcohol derivative described in Example 1, 10 parts by weight of the diazonium chloride of 5-amino-2-benzoyl-amino-1,4-diethoxybenzene hydrochloride stabilized with zinc chloride and 790 parts by weight of an oil-in-water emulsion prepared according to Example 1.

After drying, the fabric was heated for 5 minutes to 150° C. A vivid reddish yellow print was obtained that had very good fastness properties.

We claim:

1. A process for the coloration and printing of a textile by coating it with a colored film, which process comprises treating the textile with an aqueous preparation consisting essentially of 0.05 to 0.5 part of a stabilized diazonium compound per part by weight of a polyvinyl acetoacetic acid ester prepared by reacting diketene with a partially hydrolyzed graft copolymer of vinyl acetate on polyvinyl pyrrolidone, said partially hydrolyzed graft copolymer having 42 to 86 percent by weight of vinyl alcohol units, 8 to 28 percent by weight of vinyl pyrrolidone units, and 6 to 30 percent by weight of vinyl acetate units, and fixing by heating the textile to a temperature from about 90° C. to about 200° C.

2. A process as in claim 1 wherein said fixing is carried out by steaming in the presence of formaldehyde.

3. A process as in claim 1 wherein said fixing is carried out by steaming for 5 to 10 minutes at a temperature from 90° C. to 120° C.

4. A process as in claim 1 wherein said fixing is carried out by dry heating for 30 seconds to 10 minutes at a temperature from 100° C. to 200° C.

5. A process as in claim 1 wherein said aqueous preparation additionally contains 0.5 to 1.5 parts, per part by weight of said polyvinyl acetoacetic acid ester, of a precondensation product having N-methylol groups and prepared by reacting 1 to 4 molar parts of formaldehyde with 1 molar part of urea or 1 to 6 molar parts of formaldehyde with 1 molar part of melamine.

6. A process as in claim 5 wherein said aqueous preparation additionally contains a thickening agent.

7. A process as in claim 5 wherein the methylol groups of said precondensation product are at least partially etherified with an alcohol having 1 to 4 carbon atoms and 1 to 2 hydroxy groups.

8. A process as in claim 7 wherein said aqueous preparation additionally contains a thickening agent.

9. A process as in claim 3 wherein the textile is after treated with an aqueous solution of formaldehyde for ½ to 2 minutes at a temperature from 90° C. to 100° C.

10. A process as in claim 4 wherein the textile is aftertreated with an aqueous solution of formaldehyde for ½ to 2 minutes at a temperature from 90° C. to 100° C.

11. A process for the coloration and printing of a textile by coating it with a colored film, which process comprises treating the textile with an aqueous preparation consisting essentially of a polyvinyl acetoacetic acid ester prepared by reacting diketene with a partially hydrolyzed graft copolymer of vinyl acetate on polyvinyl pyrrolidone, said partially hydrolyzed graft copolymer having 42 to 86 percent by weight of vinyl alcohol units, 8 to 28 percent by weight of vinyl pyrrolidone units, and 6 to 30 percent by weight of vinyl acetate units, drying at a temperature above 80° C., then treating the textile with an aqueous solution of a stabilized diazonium compound, and fixing by heating the textile to a temperature from about 90° C. to about 200° C., said stabilized diazonium compound being employed in an amount of from 0.05 to 0.5 part per part by weight of said polyvinyl acetoacetic acid ester.

12. A process as in claim 11 wherein said aqueous preparation additionally contains 0.5 to 1.5 parts, per part by weight of said polyvinyl acetoacetic acid ester, of a precondensation product having N-methylol groups and prepared by reacting 1 to 4 molar parts of formaldehyde with 1 molar part of urea or 1 to 6 molar parts of formaldehyde with 1 molar part of melamine.

13. A process as in claim 12 wherein said aqueous preparation additionally contains a thickening agent.

14. A process as in claim 12 wherein the methylol groups of said precondensation product are at least partially etherified with an alcohol having 1 to 4 carbon atoms and 1 to 2 hydroxy groups.

15. A coating composition consisting essentially of 0.05 to 0.5 part of a stabilized diazonium compound per part by weight of a polyvinyl acetoacetic acid ester prepared by reacting diketene with a partially hydrolyzed graft copolymer of vinyl acetate on polyvinyl pyrrolidone, said partially hydrolyzed graft copolymer having 42 to 86 percent by weight of vinyl alcohol units, 8 to 28 percent by weight of vinyl pyrrolidone units, and 6 to 30 percent by weight of vinyl acetate units.

16. A coating composition as in claim 15 which additionally contains 0.5 to 1.5 parts, per part by weight of said polyvinyl acetoacetic acid ester, of a precondensation product having N-methylol groups and prepared by reacting 1 to 4 molar parts of formaldehyde with 1 molar part of urea or 1 to 6 molar parts of formaldehyde with 1 molar part of melamine.

17. A coating composition as in claim 16 which additionally contains a thickening agent.

18. A coating composition as in claim 16 wherein the methylol groups of said precondensation product are at least partially etherified with an alcohol having 1 to 4 carbon atoms and 1 to 2 hydroxy groups.

19. A coating composition as in claim 18 which additionally contains a thickening agent.

References Cited

UNITED STATES PATENTS

| | | | |
|---|---|---|---|
| 2,989,360 | 6/1961 | Mautner | 260—895 |
| 3,132,965 | 5/1964 | Schmidt et al. | 117—38 |
| 3,166,525 | 1/1965 | Perry | 117—161 |
| 3,236,913 | 2/1966 | Pfeiffer et al. | 260—856 |

WILLIAM D. MARTIN, *Primary Examiner.*

T. G. DAVIS, *Examiner.*